United States Patent
Lorello et al.

(10) Patent No.: US 8,464,855 B2
(45) Date of Patent: Jun. 18, 2013

(54) MAILING MACHINE HAVING OPTICAL SENSORS WITH IMPROVED IMMUNITY TO AMBIENT

(75) Inventors: Michael J. Lorello, Guilford, CT (US); Gary S. Jacobson, Norwalk, CT (US); George J. Doutney, Sandy Hook, CT (US)

(73) Assignee: Pitney Bowes Inc., Stamford, CT (US)

( * ) Notice: Subject to any disclaimer, the term of this patent is extended or adjusted under 35 U.S.C. 154(b) by 226 days.

(21) Appl. No.: 13/052,162

(22) Filed: Mar. 21, 2011

(65) Prior Publication Data

US 2012/0241285 A1 Sep. 27, 2012

(51) Int. Cl.
*H01J 40/14* (2006.01)

(52) U.S. Cl.
USPC .............. 198/341.01; 198/644; 250/214 B; 250/214 C

(58) Field of Classification Search
USPC .......... 198/341.01, 644; 250/214 B, 214 C
See application file for complete search history.

(56) References Cited

U.S. PATENT DOCUMENTS

| | | | | |
|---|---|---|---|---|
| 4,176,397 A | * | 11/1979 | Crom et al. | 702/165 |
| 4,207,466 A | * | 6/1980 | Drage et al. | 250/338.1 |
| 4,636,053 A | * | 1/1987 | Sakane et al. | 396/101 |
| 4,636,633 A | * | 1/1987 | Roger et al. | 250/223 R |
| 4,835,403 A | * | 5/1989 | Wisniewski | 250/559.4 |
| 5,036,187 A | * | 7/1991 | Yoshida et al. | 250/214 B |
| 5,175,529 A | * | 12/1992 | St. Clair | 340/425.5 |
| 5,384,457 A | * | 1/1995 | Sommer | 250/214 R |
| 5,710,424 A | * | 1/1998 | Theodoras et al. | 250/208.2 |
| 7,061,001 B2 | | 6/2006 | Chaudhary et al. | |
| 7,385,170 B1 | * | 6/2008 | Krumberger | 250/214 A |
| 2011/0140879 A1 | | 6/2011 | Minckler | |

* cited by examiner

*Primary Examiner* — Patrick Mackey
(74) *Attorney, Agent, or Firm* — Brian A. Lemm; Charles R. Malandra, Jr.; Steven J. Shapiro

(57) ABSTRACT

Circuitry to control reflective optical sensors is provided that reduces false detections due to ambient light without compromising the performance of the optical sensors to detect dark materials. A reflective optical sensor includes an emitter LED and photo-detector arranged to receive light from the LED that is reflected by an object being detected. A first input of a comparator is coupled to the output of the photo-detector. A second input of the comparator is coupled to the output of the photo-detector through a filtering circuit. The filtering circuit operates to filter the detector's output and adaptively adjust the trigger threshold of the comparator, thereby enabling the photo-detector to be sensitive enough to detect dark mail pieces, i.e., those mail pieces that are minimally reflective, while being immune to repeated false triggers due to excessive ambient light.

13 Claims, 2 Drawing Sheets

MAILING MACHINE HAVING OPTICAL SENSORS WITH IMPROVED IMMUNITY TO AMBIENT

FIELD OF THE INVENTION

The invention disclosed herein relates generally to optical sensing systems, and more particularly to optical sensor systems utilized in mail processing systems that have improved immunity to ambient light.

BACKGROUND OF THE INVENTION

Mail processing systems for preparing mail pieces have long been well known and have enjoyed considerable commercial success. There are many different types of mail processing systems, including, for example, inserter systems that insert material into envelopes and mailing machines that print postage indicia on mail pieces. Optical sensors are commonly used in such mail processing systems to ensure that all parts in the system function in a coordinated way. For example, in a mail inserting system where a plurality of enclosure feeders are used to release documents onto a transport path and the released documents are collated into a stack for insertion into an envelope, optical sensors can be used to check the arrival of the envelope, the movement of the released documents, and so forth. Mailing machines range from relatively small units that handle only one mail piece at a time, to large, multi-functional units that can process thousands of mail pieces per hour in a continuous stream operation. The larger mailing machines often include different modules that automate the processes of producing mail pieces, each of which performs a different task on the mail piece. Such modules could include, for example, a singulating module, i.e., separating a stack of mail pieces such that the mail pieces are conveyed one at a time along a transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user.

There are generally two different types of optical sensors that are commonly used to track the location of each mail pieces as they pass through such mail processing systems. Each type includes a light-emitting diode (LED) and photo-detector. In one type, referred to as a through-beam detector, the LED and photo-detector are above and below the transport path and a mail piece passes between them. Detection occurs by the mail piece blocking the light from the LED that is received by the photo-detector. In the other type of sensor, referred to as a reflective sensor, the LED and photo-detector are located adjacent to one another in the same plane. As mail pieces pass over them, they are detected by the light from the LED that is reflected back to the photo-detector by the mail piece. Reflective sensors are generally used in areas where the transport path is not covered, e.g., the input hopper area, thereby not having any structure on which to mount the LED or photo-detector such that the mail piece can pass directly between the LED and photo-detector. Such reflective sensors must be sensitive enough to enough to detect the presence of mail materials of various degrees of optical reflectance.

Mail processing systems are subject to widely varying ambient light conditions, such as when positioned near an office window. In most situations the ambient light that leaks internal to the machine derives primarily, if not fully, from artificial lighting in the office. In other situations, however, the ambient light level can be much higher from additive sunlight. Ambient light can 'leak' into the system into the areas in which the photo-detectors are disposed (typically either along the deck or opposite it). This can cause problems, especially with respect to reflective sensors. The photo-detectors are typically continuously scanned in order to detect presence of a mail piece along the transport path, but varying ambient light conditions in some cases cause the sensor to signal to the mail processing system that a mail piece is present when in fact the photo-detector has detected only the elevated ambient light from office lighting or sunlight. In effect, such elevated ambient light saturates the photo-detectors making the controlling software think that a mail piece is reflecting light onto them, referred to as a false-detection. Such false detections made by sensors located in the input hopper area can result, for example, in the system randomly starting when no mail is actually present in the input area.

In such cases, end users may be forced to draw blinds in a room, reorient the system or place the system in an interior room to eliminate the high ambient light conditions from sunlight which trigger the false-detections noted above. But relying on end users to resolve a machine error may be problematic and limiting the placement of a mail processing system may not be practical for a particular installation. To help prevent such problems, reflective sensors are traditionally used with trade-offs. Either the sensors are sensitive enough to detect dark material (e.g., dark colors such as brown or black), but could be tricked by excessive levels of ambient light, or the sensors would be more immune to ambient light, but not reliably detect the presence of dark material. Accordingly, there is a need for a mail processing system having optical sensors that can detect dark material but function more reliably in varying lighting conditions.

SUMMARY OF THE INVENTION

The present invention alleviates the problems associated with the prior art by providing reflective optical sensors that have improved immunity to ambient light, thereby reducing false detections due to ambient light, without compromising the performance of the optical sensors to detect dark materials.

In accordance with embodiments of the present invention, a reflective optical sensor includes an emitter LED and photo-detector arranged to receive light from the LED that is reflected by an object being detected. A first input of a comparator is coupled to the output of the photo-detector. A second input of the comparator is coupled to the output of the photo-detector through a filtering circuit. The filtering circuit operates to filter the detector's output and adaptively adjust the trigger threshold of the comparator, thereby enabling the photo-detector to be sensitive enough to detect dark mail pieces, i.e., those mail pieces that are minimally reflective, while being immune to repeated false triggers due to excessive ambient light.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
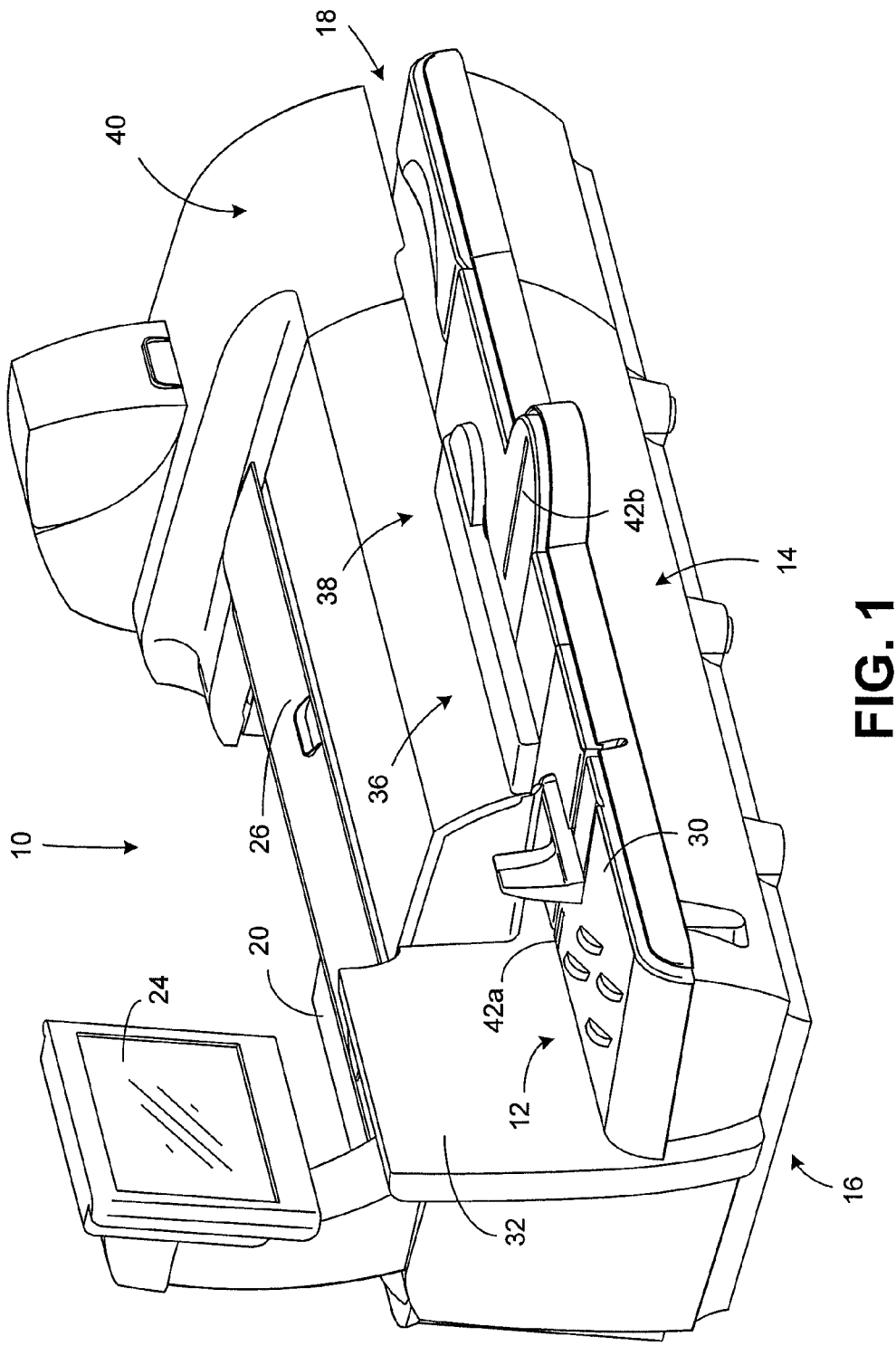
FIG. 1 illustrates a mailing machine in which the present invention can be utilized.

In describing the present invention, reference is made to the drawings, wherein there is seen in FIG. 1 a mailing machine 10 in which the present invention can be utilized. It should be noted that while the following description is being made with respect to a mailing machine, the present invention is not so limited and can be utilized in any type of system that utilizes optical sensors. Mailing machine 10 comprises a base unit, designated generally by the reference numeral 14, the base unit 14 having a mail piece input end, designated generally by the reference numeral 16, and a mail piece output end, designated generally by the reference numeral 18. A control unit 20, such as, for example, a general or special purpose microprocessor or the like, is mounted on the base unit 14, to provide overall control of the operation of the mailing machine 10. One or more input/output devices, such as, for example, a touch-screen display device 24, is coupled to the control unit 20. One or more cover members 26 are pivotally mounted on the base 14 so as to move from the closed position shown in FIG. 1 to an open position (not shown) to expose various operating components and parts for service and/or repair as needed.

The base unit 14 further includes a horizontal feed deck 30 which extends substantially from the input end 16 to the output end 18. A plurality of nudger rollers 12 are suitably mounted under the feed deck 30 and project upwardly through openings in the feed deck so that the periphery of the rollers 12 is slightly above the upper surface of the feed deck 30 and can exert a forward feeding force on a succession of mail pieces placed in the input end 16. A registration wall 32 defines a mail piece registration surface substantially perpendicular to the feed deck 30 that extends substantially from the input end 16 to the output end 18. Mail pieces placed in the input end 16 are fed by the nudger rollers 12 along the feed deck 30, with the top edge of the mail piece being registered against the wall 32. The mail pieces may be passed through one or more modules of the mailing machine 10 by a transport system (not shown), which can include, for example, rollers and/or belts. Such modules can include, for example, a singulator module and a moistening module, located generally in the area indicated by reference numeral 36, a weighing module, located generally in the area indicated by reference numeral 38, and a metering/printing module located generally in the area indicated by reference numeral 40. One or more optical reflective sensors 42a,42b can be located along the feed deck 30 in various locations to provide signals to the control unit 20 to indicate the position of a mail piece on the deck 30. As these sensors 42a,42b are not located beneath the cover member 26, they are susceptible to varying ambient light conditions.

Figure 2:
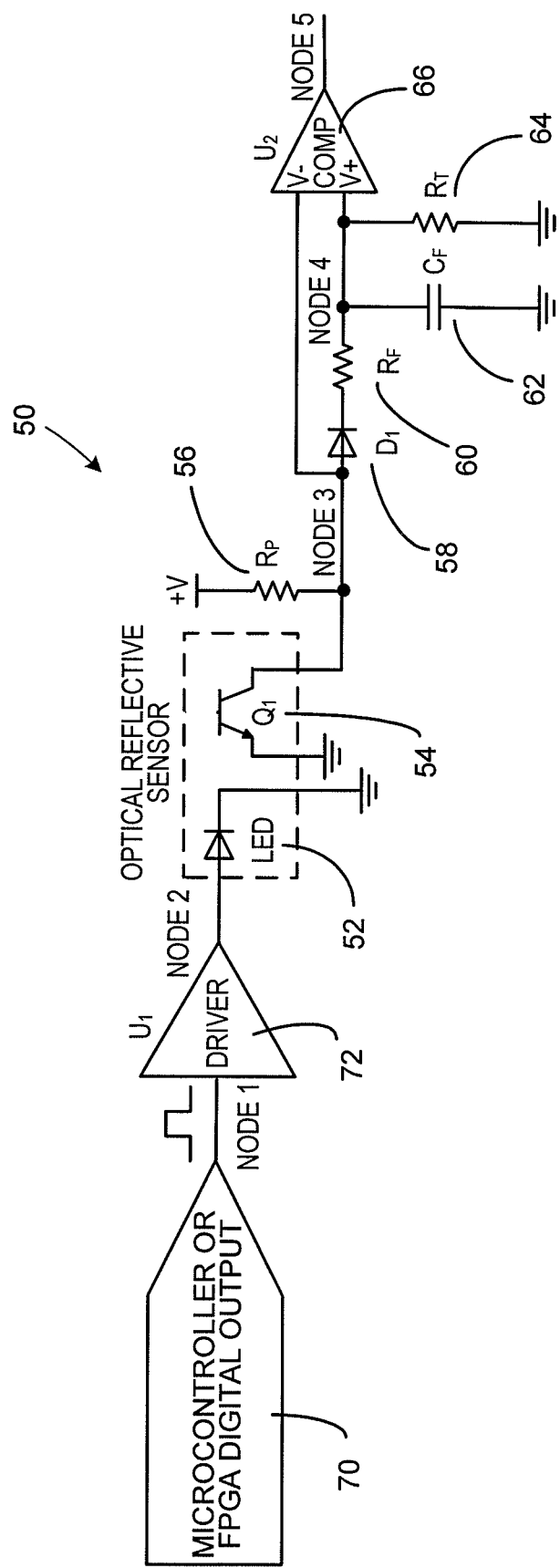
FIG. 2 illustrates a schematic of a circuit for adjusting the current to an LED of an optical sensor according to an embodiment of the present invention.

Referring now to FIG. 2, there is illustrated in schematic diagram form a circuit 50 that provides a solution to the problem of excessive ambient light tricking a reflective sensor, e.g., sensor 42a,42b,into thinking it is seeing a target when in fact it is seeing stray light entering the detector. As described below, circuit 50 does this by a combination of pulsing the sensor's emitter, filtering the detector's output, and adaptively adjusting the trigger threshold at which an object is detected, thereby enabling optical reflective sensors, e.g., sensors 42a,42b,to be sensitive enough to detect dark mail pieces, i.e., those mail pieces that are minimally reflective, while being immune to repeated false triggers due to excessive ambient light. The circuit 50 includes an optical reflective sensor consisting of emitter LED 52 and photo-detector 54 in the form of a phototransistor $Q_1$. The output of the photo-detector 54 is coupled to a voltage supply +V through a pull-up resistor $R_P$ 56. Circuit 50 further includes a filtering circuit consisting of a diode $D_1$ 58, a filter resistor $R_F$ 60, a filter capacitor $C_F$ 62, and a threshold adjustment resistor $R_T$ 64. The output node of the photo-detector 54 is coupled to the input of the filtering circuit (Node 3 in FIG. 2). A voltage comparator $U_2$ 66 has a first input (V−) coupled to the output of the photo-detector 54, and a second input (V+) coupled to the output of the filtering circuit (Node 4 in FIG. 2). In the example implementation illustrated in FIG. 2, when the voltage input to the first input (V−) is greater than the voltage input to the second input (V+), the output of the comparator 66 will be a "low" logic level, and when the voltage input to the first input (V−) is not greater than the voltage input to the second input (V+), the output of the comparator 66 will be a "high" logic level. Filter resistor 60 and filter capacitor 62 form a low pass filter to reduce noise on the input to the comparator 66. The filtering circuit (diode 58, filter resistor 60, filter capacitor 62, and resistor 64) adjusts the voltage level input to the second input of the comparator 66 in relation to the voltage input to the first input of the comparator 66, thereby adjusting the threshold at which the output of the comparator 66 will change states to reduce false detection caused by the photo-detector 54 receiving ambient light as described below.

In operation, a microcontroller (which may be part of controller 20 of FIG. 1) or a programmable device 70, such as, for example, a Field Programmable Gate Array (FPGA) outputs a pulse width modulated signal which, when driven through an amplifier circuit $U_1$ 72, provides current to the LED 52. The light produced by LED 52 reflects off of a target, such as a mail piece when it is passing over the sensor, and returns to illuminate the detector phototransistor $Q_1$ 54. Pull-up resistor 56 sources current into Node 3, pulling the voltage toward the supply voltage (+V) when detector $Q_1$ 54 does not receive sufficient light to turn on. Diode $D_1$ 58 prevents current from flowing from Node 4 to Node 3.

When LED 52 is off, no light is produced to be reflected off of the object to be detected. Thus, no light enters the detector 54. Detector 54 remains in an "off" state, passing minimal current. Thus, Node 3 sits at a voltage which is the result of a voltage drop across resistor 56. This voltage drop is determined by the leakage current which flows through resistor 56, diode 58, resistor 60 and resistor 64. Node 4 sits at a lower voltage than Node 3 due to the voltage drops across diode 58 and resistor 60. Since Node 3 is at a higher voltage than Node 4, the V+ input is less than the V− input of the voltage comparator 66, thus causing the comparator 66 to output a "low" logic level at Node 5. At the same time, capacitor 62 is charged to a steady-state voltage determined by the amount of current that flows through resistor 64, thus holding Node 4 at said voltage. In this example implementation, a "low" level indicates to a control unit (e.g., control unit 20 of FIG. 1) coupled to the output of comparator 66 that the sensor has not detected the presence of an object.

When the microcontroller or FPGA 70 outputs a pulse signal on Node 1, current passes through LED 52 and LED 52 emits light. This light can reflect off of the object to be detected and enter the detector 54. If a sufficient amount of light enters detector 54, then detector 54 will turn to an "on" state and pass current, thus creating a voltage drop across resistor 56 and lowering the voltage at Node 3 and at the V− input of the comparator 66. If the voltage at Node 3 falls below that of Node 4, diode 58 will prevent capacitor 62 from discharging into Node 3. When the voltage at Node 3 falls below the voltage at Node 4 (which is held by the charge on capacitor 62), the output of the comparator 66 will output a "high" level at Node 5. In this example implementation, a "high" level indicates to the control unit (e.g., control unit 20 of FIG. 1) that the sensor has detected the presence of an object. Capacitor 62 will discharge at a rate determined by its value along with the value of resistor 64. However, this rate is set according to the following equation:

$$P_{PULSE} \geqq R_T \times C_F \tag{Equation 1}$$

where $P_{PULSE}$ is the period of the pulse from microcontroller 70 to the LED 52. The combination of the width of the pulse, the period of the pulse, and the roll-off frequency of the low-pass filter must be set properly. Too high a filter roll-off frequency or too short a pulse period would result in capacitor 62 not remaining at a steady-state voltage. Alternatively, resistor 64 could be replaced with a current sinking device or circuit, such as a current-output Digital to Analog Converter (DAC). This adjustment circuit, when controlled by software, provides a way to further adjust the sensitivity of the circuit 50.

If ambient light is present while the LED 52 is off, this ambient light may enter detector 54, causing it to pass some amount of current. The resulting current will cause the voltage at Node 3 to sink to a level below the level set when no ambient light is entering detector 54. This lower level, however, will also produce a correspondingly lower level at Node 4, which will pull the output of the comparator 66 to a "low" state at Node 5. Thus, the circuit 50 will, in effect, self-adjust the trigger threshold for comparator 66 by adjusting the voltage values at Node 3 and Node 4, resulting in the voltage level at Node 4 being lower than the voltage level at Node 3 regardless of the amount of ambient light that may be detected by the detector 54. The time required for this adjustment is dependent on the time required for the capacitor 62 to discharge, but generally will be in the range of milliseconds. In this manner, the output at Node 5 will be returned to and remain in "low" state in a manner of milliseconds even if the detector 54 is suddenly exposed to ambient light (such as by the sudden opening of a blind that allows sunlight into the room), rather than continuing with a false-detection due to the ambient light. By programming the control unit (not shown) that receives the output of the comparator 66 to disregard such single detections, such as can occur when such sudden exposures happen, that are not followed by immediate subsequent detections (such as would occur if a mail piece were actually being detected), false-detections due to ambient light can practically be eliminated.

However, the circuit 50 will continue to operate as described above when an object, such as a mail piece, is placed between the sensor and the ambient light source and the LED 52 turns on to detect if an object is present above the sensor. Such would occur, for example, when mail pieces are placed on the deck 30 over the sensor 42a, and the ambient light is blocked by the object, thus enabling the circuit 50 to operate as if no ambient light were present. Specifically, when the sensor is covered by an object, e.g. a mail piece, no light enters the detector 54. Detector 54 remains in an "off" state, passing minimal current. Node 4 sits at a lower voltage than Node 3 due to the voltage drops across diode 58 and resistor 60. Since Node 3 is at a higher voltage than Node 4, the V+ input is less than the V− input of the voltage comparator 66, thus causing the comparator 66 to output a "low" logic level at Node 5. When the microcontroller or FPGA 70 outputs a pulse signal on Node 1, current passes through LED 52 and LED 52 emits light, which will reflect off of the object to be detected and enter the detector 54. Detector 54 will turn to an "on" state and pass current, thus creating a voltage drop across resistor 56 and lowering the voltage at Node 3 and at the V− input of the comparator 66. When the voltage at Node 3 falls below the voltage at Node 4, held by the charge across capacitor 62, the output of the comparator 66 will output a "high" level at Node 5. Once capacitor 62 has sufficiently discharged such that the voltage at Node 4 is lower than the voltage at Node 3 (due to the voltage drops across diode 58 and resistor 60), the output of the comparator 66 will return to a "low" level. However, the pulsing of the LED 52, and the pulsed reflected light received by the detector 54, causes detector 54 to pulse between "on" and "off" states. This causes the capacitor 62 to continuously charge and discharge, but due to compliance with Equation (1) above, results in the output of the comparator 66 remaining at a "high" level until the mail piece is no longer covering the LED 52 and detector 54. At this point the voltage levels on Node 3 and Node 4 will automatically adjust based on the amount of ambient light being received by the detector 54, with Node 4 being pulled lower than Node 3 due to the operation of the filtering circuit, causing the output of the comparator 66 to return to a "low" level, regardless of the amount of ambient light present. The self-adjusting nature of circuit 50 enables reflective sensors to be used in applications such as input hopper sensors without having to worry about false triggers due to ambient light. Thus, it removes some of the variability associated with the unknown customer environments in which the systems will be installed.

Thus, according to the present invention, optical sensors that can detect dark material but function more reliably in varying lighting conditions are provided. By pulsing the sensor's emitter, and filtering the detector's output to adaptively adjust the detector's trigger threshold, the present invention provides a solution to the problem of excessive ambient light tricking a reflective sensors into thinking it is seeing a target when in fact it is seeing stray light entering the detector while still enabling the sensor to accurately detect dark materials.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A mail processing system comprising:
   a controller to control operation of the mail processing system;
   a transport device to transport mail pieces along a transport path of the mail processing system, the transport device being controlled by the controller;
   at least one optical sensor located along the transport device for determining a location of a mail piece along the transport path, the optical sensor including a light emitting diode that is powered based on a pulse width modulated signal, and a photo-detector, the photo-detector causing a voltage level at a photo-detector output node to vary based on an amount of light being received by the photo-detector;

a filtering circuit having a diode coupled to the photo-detector output node and a low pass filter coupled between the diode and an output of the filtering circuit; and a comparator having a first comparator input, a second comparator input, and a comparator output, the first comparator input being coupled to the photo-detector output node, the second comparator input being coupled to the output of the filtering circuit, the comparator output indicating when an object is detected by changing states based on voltage levels input to the first comparator input and second comparator input, the voltage levels at the first comparator input and second comparator input being dependent on the amount of light being received by the photo-detector, wherein the filtering circuit adjusts the voltage level at the second comparator input to control a threshold at which the comparator changes states to reduce false detections caused by the photo-detector receiving ambient light.

2. The mail processing system of claim 1, wherein the low pass filter further comprises:

a filter resistor coupled between the diode and second comparator input; and a filter capacitor coupled between the second comparator input and ground.

3. The mail processing system of claim 1, wherein the filtering circuit further comprises:

a threshold resistor coupled between the second comparator input and ground.

4. The mail processing system of claim 1, wherein the filtering circuit further comprises:

a current sinking device coupled between the second comparator input and ground.

5. The mail processing system of claim 1, further comprising:

a pull-up resistor coupled between the photo-detector output node and a supply voltage.

6. The mail processing system of claim 1, wherein the mail processing system is a mailing machine.

7. The mail processing system of claim 1, wherein the mail processing system is an inserting machine.

8. A reflective optical sensor circuit comprising:

an emitter and photo-detector, the photo-detector being positioned to detect light output by the emitter that reflects off of an object being detected, the photo-detector causing a voltage level at a photo-detector output node to vary based of an amount of light being received by the photo-detector;

a device to generate a pulse width modulated signal used to cause the emitter to emit light;

a filtering circuit having a diode coupled to the photo-detector output node and a low pass filter coupled between the diode and an output of the filtering circuit; and a comparator having a first comparator input, a second comparator input, and a comparator output, the first comparator input being coupled to the photo-detector output node, the second comparator input being coupled to the output of the filtering circuit, the comparator output indicating when an object is detected by changing states based on voltage levels input to the first comparator input and second comparator input, the voltage levels at the first comparator input and second comparator input being dependent on the amount of light being received by the photo-detector, wherein the filtering circuit adjusts the voltage level at the second comparator input to control a threshold at which the comparator changes states to reduce false detections caused by the photo-detector receiving ambient light.

9. The reflective optical sensor circuit of claim 8, wherein the low pass filter further comprises:

a filter resistor coupled between the diode and second comparator input; and a filter capacitor coupled between the second comparator input and ground.

10. The reflective optical sensor circuit of claim 8, wherein the filtering circuit further comprises:

a threshold resistor coupled between the second comparator input and ground.

11. The reflective optical sensor circuit of claim 8, wherein the filtering circuit further comprises:

a current sinking device coupled between the second comparator input and ground.

12. The reflective optical sensor circuit of claim 8, further comprising:

a pull-up resistor coupled between the photo-detector output node and a supply voltage.

13. The reflective optical sensor circuit of claim 8, wherein the device to generate a pulse width modulated signal further comprises:

a programmable logic device.

* * * * *

UNITED STATES PATENT AND TRADEMARK OFFICE
CERTIFICATE OF CORRECTION

| | | |
|---|---|---|
| PATENT NO. | : 8,464,855 B2 | Page 1 of 1 |
| APPLICATION NO. | : 13/052162 | |
| DATED | : June 18, 2013 | |
| INVENTOR(S) | : Michael J. Lorello, Gary S. Jacobson and George J. Doutney | |

It is certified that error appears in the above-identified patent and that said Letters Patent is hereby corrected as shown below:

Title Page, Item (54) and in the specification, Column 1, line 1, the title should be
"MAILING MACHINE HAVING OPTICAL SENSORS WITH IMPROVED IMMUNITY TO AMBIENT LIGHT".

Signed and Sealed this
Third Day of September, 2013

Teresa Stanek Rea
*Acting Director of the United States Patent and Trademark Office*